United States Patent [19]

Ehrat

[11] 4,362,930
[45] Dec. 7, 1982

[54] DATA CARRIER CARD

[75] Inventor: Kurt Ehrat, Steinmaur, Switzerland

[73] Assignee: Zeag Systems A.G., Schlieren, Switzerland

[21] Appl. No.: 223,848

[22] Filed: Jan. 9, 1981

[30] Foreign Application Priority Data

Jan. 10, 1980 [CH] Switzerland .......................... 155/80

[51] Int. Cl.$^3$ ............................................ G06K 21/04
[52] U.S. Cl. ...................................... 235/487; 235/489
[58] Field of Search ................. 340/146.3 Z; 235/487, 235/489, 488

[56] References Cited

U.S. PATENT DOCUMENTS

| 3,592,973 | 7/1971 | Gray | 235/489 |
|---|---|---|---|
| 3,643,216 | 2/1972 | Greenaway | 340/146.3 P |
| 3,688,088 | 8/1972 | Brown et al. | 235/489 |
| 3,728,521 | 4/1973 | Borough et al. | 235/487 |
| 3,936,662 | 2/1976 | Rausing | 235/487 |
| 4,021,664 | 5/1977 | Ormsby | 235/487 |
| 4,230,939 | 10/1980 | de Bont et al. | 235/488 |

FOREIGN PATENT DOCUMENTS

| 2224937 | 2/1974 | Fed. Rep. of Germany . | |
| 2352366 | 5/1974 | Fed. Rep. of Germany . | |
| 2659639 | 6/1978 | Fed. Rep. of Germany . | |
| 2751064 | 6/1978 | Fed. Rep. of Germany | 235/487 |
| 2022300 | 12/1979 | United Kingdom | 235/487 |

OTHER PUBLICATIONS

IBM Technical Disclosure Bulletin, vol. 7, No. 2, Jul. 1964, p. 161 "Record Card", C. E. Schroeder.

Primary Examiner—Donald J. Yusko
Attorney, Agent, or Firm—Kontler, Grimes & Battersby

[57] ABSTRACT

A laminated hard-to-counterfeit data carrier card with an opaque median plastic layer and transparent outer plastic layers has a plurality of groups of light conductors which extend through the median layer and represent encoded information which can be decoded by inserting the card into the slot of a decoding apparatus wherein a light source directs radiation against one side of the inserted card and a suitable circuit including rhotodiodes decodes the pattern of light rays which issue from the other side of the inserted card. The encoded information can represent sums of money, units of time, the serial number of the card, the identification number of the bearer and/or other data. Each group of light conductors can be destroyed or removed independently of the other groups, especially if each group denotes a unit of currency. The cross-sectional area of each light conductor is less than the square of the thickness of the card. The light conductors may constitute holes, light conducting filaments of glass or plastic, or light-conducting tubes. The light conductors form several parallel rows and the diameter of each light conductor is approximately 0.05 mm. The distance between neighboring light conductors in a group is approximately 0.3 mm.

33 Claims, 13 Drawing Figures

DATA CARRIER CARD

BACKGROUND OF THE INVENTION

The present invention relates to data carriers in general, and more particularly to improvements in card-like data carriers. Still more particularly, the invention relates to improvements in card-like flat data carriers for storage of information which can be decoded by automatic decoding machines or readers and can be used as an identification card, a credit card, a money substitute card, a time recording card or for analogous purposes.

It is well known to utilize data carriers in the form of cards (identification cards, credit cards or the like) as a means for gaining access to restricted areas. Such cards contain information which can be decoded by machines, e.g., by machines wherein the card is introduced into a slot for examination by automatic scanning or decoding equipment.

A card which is used as a substitute for cash contains a plurality of discrete data or bits of information each of which denotes a particular sum of money. A fresh or unused card stores information denoting the maximum selected sum of money, e.g., the sum of one hundred dollars. Such information consists of several discrete data or bits of information each of which denotes a smaller sum of money, e.g., one dollar. In other words, the total information on an unused card which serves as a substitute for cash is divisible into a given number of identical data each denoting a corresponding fraction of the maximum sum of money which is represented by the total information on the unused card. Each of such plurality of data is assigned a discrete portion or storage area on the card, and each discrete portion can be treated to erase or cancel the information which is stored therein. The erasure or cancellation of information on discrete areas is effected at a testing or examining station and is equivalent to cash payment of the corresponding sum of money. The card is valueless and can be discarded as soon as the erasure or cancellation of information on the last discrete portion is completed.

A card of the just outlined character cannot be used as a means for identifying the bearer if it is printed or otherwise manufactured in large numbers and each of such large number of cards contain identical information, e.g., if each card can serve as a substitute for the same amount of money. Therefore, it is often desirable to issue individualized cards each of which stores information denoting a certain sum of money as well as additional information pertaining to the owner or authorized user or bearer of such card.

A time sheet or card can be used to record information pertaining to the times of the day, to the days of the week, etc. Such cards are insertable into suitable machine (e.g., clocks) which encode the time of the day and/or the day of the week and/or other information which is indicative of the time when the card is provided with or relieved of information. The information is normally stored in a form which can be decoded by automatic decoding or reading equipment.

Each and every one of the above enumerated data carrier cards must satisfy at least some, and preferably all, of the following requirements:

First of all, a data carrier card should be constructed and assembled in such a way that it cannot be readily falsified or counterfeited by unauthorized persons. In the case of cards which are used as substitutes for cash, the time, effort and equipment needed for "reinstatement" of previously erased information denoting a given sum of money must be more expensive than the sum of money which is denoted by the "reinstated" information. In other words, tampering with such cards for the purpose of storing therein information denoting given sums of money must be sufficiently expensive to deter the would-be forgers from attempting to encode cancelled information.

Secondly, the data carrier card must be of the type which is capable of being mass-produced at an extremely low cost, and the nature of information which is encoded therein or which is to be encoded therein must be such that the information can be encoded and/or decoded by resorting to relatively simple and inexpensive machinery. For example, when a card is to be used as a substitute for a given sum of money, the machine which handles such cards at a counter or the like must be less expensive than the clerk or another employee who would be in charge of accepting or handling out sums of money in the absence of cards.

Still further, the methods and/or machines for the making of data carrier cards should be sufficiently complex and/or expensive to deter all would-be forgers or imitators from investing the necessary capital and/or time. This applies especially for cards which are used as substitutes for cash.

The following constitute but a few of presently known data carrier cards which fail to satisfy the above enumerated requirements:

(a) Cards which are provided with magnetic tracks for storage of information thereon.
(b) Cards wherein the information is encoded in the form of holes or perforations.
(c) Cards with printed conductor tracks, including cards with tracks acting not unlike high-frequency resonators.
(d) Cards with highly integrated circuits, for example, cards of the type disclosed in German Offenlegungsschrift No. 2,224,937.
(e) Cards which embody optical reflectors or reflecting zones, for example, of the type disclosed in German Offenlegungsschrift No. 2,659,639.
(f) Cards with information which constitutes a holograph. Cards of such type are disclosed in U.S. Pat. No. 3,643,216 granted Feb. 15, 1972 to Greenaway et al.

The cards (a) to (e) bear unidimensional or two-dimensional information. Therefore, such cards can be readily copied by resorting to commercially available apparatus or machines. Therefore, cards of the type (a), (b), (c), (d) and/or (e) can be readily falsified unless they are provided with additional means or are produced and/or treated in accordance with further techniques which prevent ready and inexpensive counterfeiting. One of such techniques involves the integration of a magnetic tape or strip into a card which is provided with hard-to-copy data, i.e., with information which cannot be readily copied by forgers or cannot be copied at all. Cards with highly integrated circuits cannot be readily copied; however, their cost is extremely high. Cards which embody reflection zones or holographic information can be said to carry data in three-dimensional form which cannot be readily copied by resorting to two-dimensional copying equipment. Therefore, such cards cannot be readily forged. However, the cost of presently known cards bearing three-dimensional information is often much too high for a number of uses so that the field of application of such cards is rather limited.

OBJECTS AND SUMMARY OF THE INVENTION

An object of the invention is to provide a novel and improved carrier of encoded information which cannot be readily copied, falsified, forged and/or altered by unauthorized persons.

Another object of the invention is to provide a data carrier which can store substantial amounts of information in a small area and which can be readily altered by authorized persons to modify the information which is encoded thereon.

A further object of the invention is to provide a novel and improved multiple-purpose carrier of encoded information which can be used as a substitute for cash, as a means of identification, as a time recording device and/or a combination of the above.

An additional object of the invention is to provide a data carrier which occupies little room, which can store several types of encoded information, which can store information capable of being decoded and/or altered in relatively simple and compact machines, and which can be used as a superior substitute for several heretofore known data carriers.

Another object of the invention is to provide the data carrier with novel and improved means for storing encoded information.

A further object of the invention is to provide the data carrier with novel and improved means for facilitating rapid and convenient modification (including erasure, cancellation, destruction and/or reshaping) of information which is encoded therein.

An additional object of the invention is to provide a data carrier which can be carried along by the user, which can be used to afford access to restricted areas, to pay debts, to open doors or gates, to identify the bearer, user or owner, to record time or other information and/or to perform two or more of the just enumerated functions, and which is capable of indicating to the user or owner the amount or amounts of remaining information if the nature of information which is encoded therein is such that the amount of information or the space which is available for encoding of information dwindles with progressing use of the carrier.

A further object of the invention is to provide a data carrier card which cannot be readily reproduced in available copying or like machines.

Another object of the invention is to provide a data carrier card which can be mass-produced at reasonable or low cost in spite of the fact that it cannot be readily copied or altered by unauthorized persons to the advantage of such persons.

The invention is embodied in a flat (preferably card-like) data carrier which has a predetermined thickness (D) and bears encoded information decipherable by an automatic reader or decoding means and denoting, for example, sums of money, the identity of the user or owner and/or the time of the day, the day of the week or the like. The data carrier comprises an opaque layer of synthetic plastic material or the like and a plurality of light conductors which are machined into or embedded in and extend through the layer. The geometric distribution (arraying or patterning) and/or orientation of the light conductors relative to each other and relative to the plane of the layer constitute at least a portion of the encoded information, and each conductor has a cross-sectional area which at most equals $D^2$.

At least some of the light conductors may constitute holes (e.g., holes which are drilled or burned into the material of the layer or holes which are formed by removing thin wires or like inserts from a mold wherein the layer is formed by pouring plasticized synthetic plastic material into a form resembling a flat, thin card or a like compact body). If some or all of the light conductors are holes, the diameter of each hole is preferably less than $D/2$. The forming of holes by removing material with one or more lasers or spark generating electrodes is preferred over mechanical removal of material by drilling or a similar technique because drilling is expensive, especially if the diameters of the holes are extremely small, namely, in the range of a minute fraction of one millimeter.

The data carrier preferably further comprises two light-transmitting outer layers or covers which flank the opaque layer and protect the light conductors from contamination and/or unintentional deformation.

The light conductors preferably form a plurality of discrete groups each of which contains at least two but preferably at least three spaced-apart light conductors. The distance between the neighboring conductors of a group is less than $2D$ and preferably less than $D$. The conductors can form at least one elongated row, preferably two or more parallel rows, which are normal or substantially normal to the direction of insertion of the data carrier into a reader of encoded information, e.g., into a machine which opens the gate of a parking garage, which cancels a certain amount of encoded information, which generates a signal in response to detection of identification of the bearer, which allows access to restricted areas in a plant, military establishment or the like and/or which performs two or more such functions.

In accordance with a presently preferred embodiment of the invention, each of the aforementioned groups can contain three light conductors and the light conductors of each group (or at least of ten different groups) occupy three of five possible locations or positions in the respective portion of the opaque layer. Thus, the locations of at least ten discrete groups allow for ten different distributions of three light conductors each, and each such different distribution can denote a different one of ten decimal numbers 0 to 9.

The material of the data carrier (or at least of the opaque layer of the data carrier) allows for thermally, chemically and/or mechanically induced destruction (deformation, cancellation, erasure or alteration) of selected light conductors, preferably in such a way that the light conductors of one or more selected groups are deformed, altered, eliminated or otherwise modified in a single operation. For example, if each group of light conductors denotes a given unit of currency, simultaneous cancellation of a given group of light conductors is tantamount to a reduction of the total amount of currency by one unit. The aforediscussed destruction can also involve bodily removal of that portion of the opaque layer which contains the selected group or groups of light conductors and/or the application of suitable (preferably readily detectable) coloring matter so that the owner or user of the data carrier is in a position to ascertain the condition of the carrier after one or more operations which involve destruction of one or more groups of light conductors.

The novel features which are considered as characteristic of the invention are set forth in particular in the appended claims. The improved data carrier itself, however, both as to its construction and the mode of making and utilizing the same, together with additional features and advantages thereof, will be best understood upon perusal of the following detailed description of certain specific embodiments with reference to the accompanying drawing.

BRIEF DESCRIPTION OF THE DRAWING

FIG. 1b is a sectional view as seen in the direction of arrows from the line A—A of FIG. 1a;

DESCRIPTION OF THE PREFERRED EMBODIMENTS

Figure 1A:
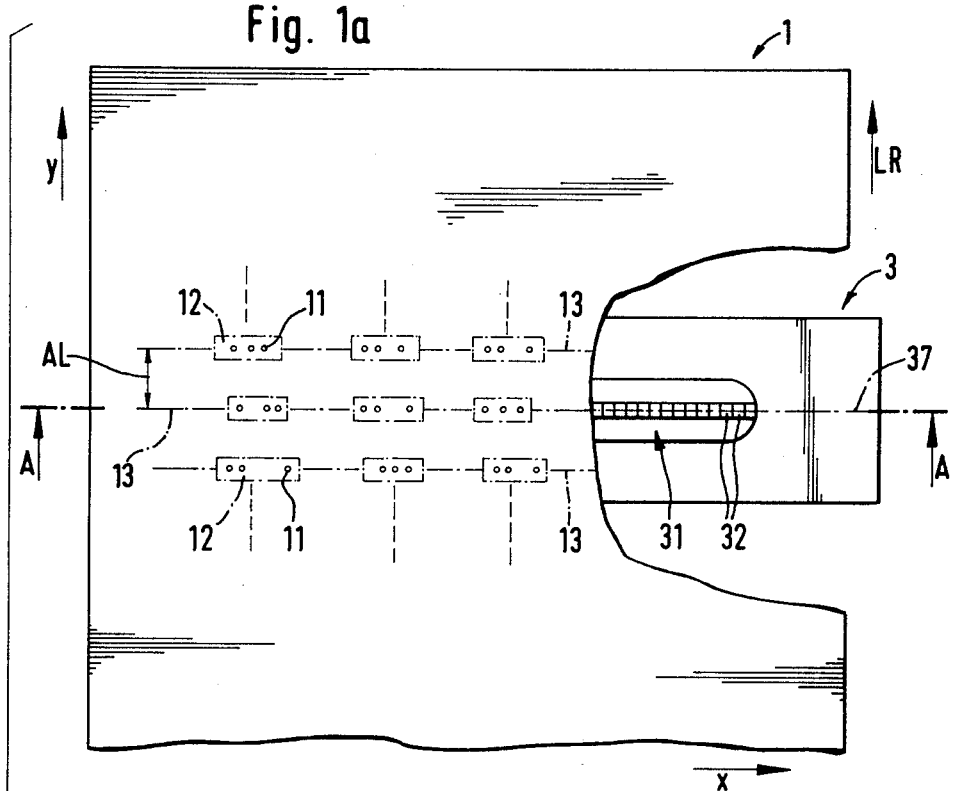
FIG. 1a is an enlarged fragmentary plan view of a laminated card-like data carrier which embodies one form of the invention and further showing a portion of an apparatus or machine serving to decode the information which is borne by the carrier.
Figure 1B:
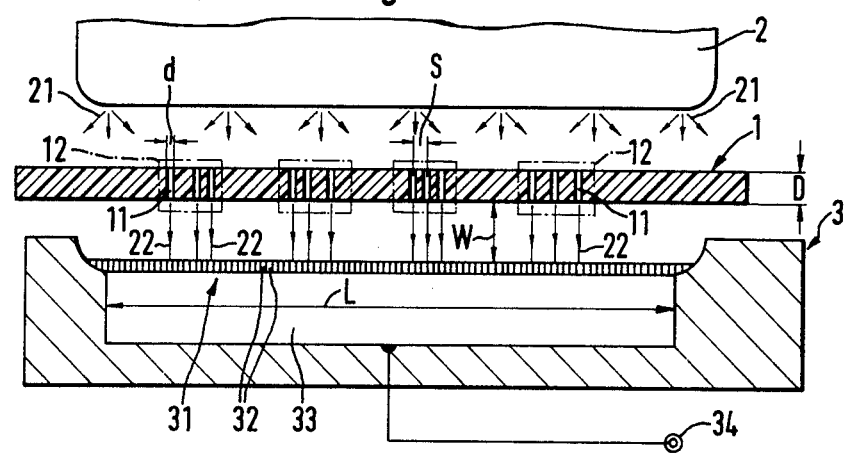
Figure 2:
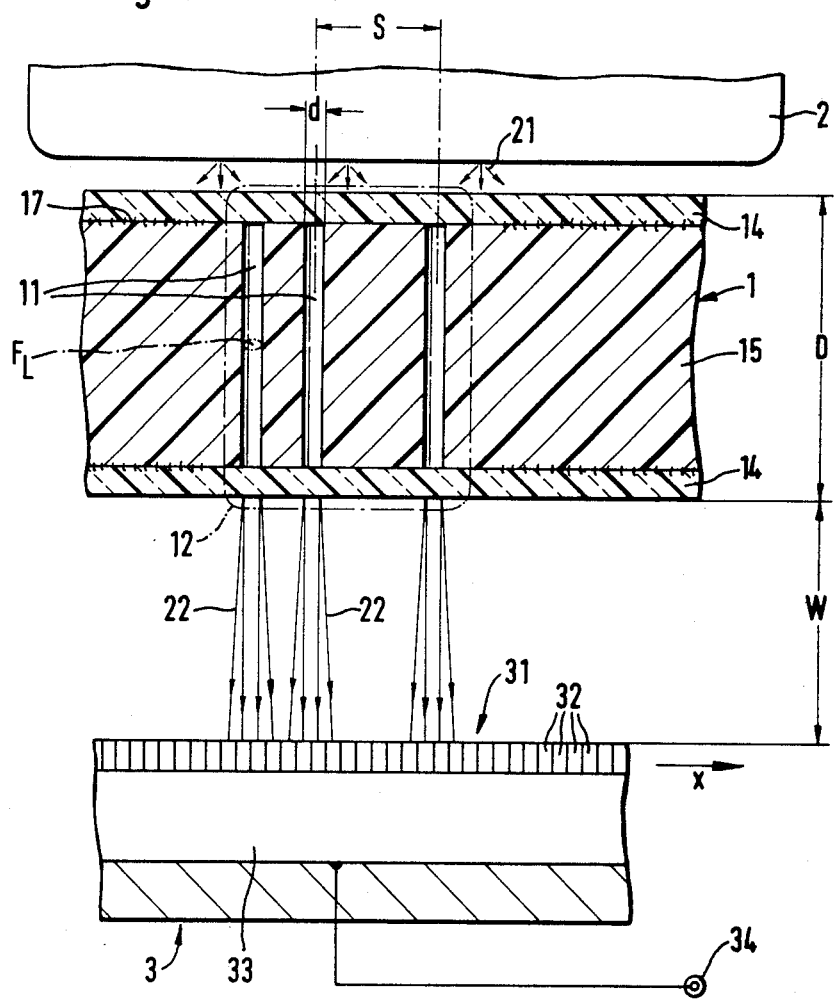
FIG. 2 is a greatly enlarged view of a detail in the sectional view of FIG. 1b.

The data carrier card 1 of FIGS. 1a, 1b and 2 consists essentially of synthetic plastic material and its dimensions can but need not match those of conventional cards. For example, the card 1 may constitute a rectangle having a length of 85 mm, a width of 55 mm and a thickness which is a fraction of one millimeter, e.g. 0.7 mm.

In accordance with a feature of the invention, the information which is encoded in the card 1 comprises several parallel rows 13 of light conductors 11 each of which is elongated and extends at right angles to the plane of the card. Alternatively, and as shown, for example, in FIG. 6 or 7, the light conductors may make oblique angles with the major surfaces of the card. Each light conductor 11 is configured and/or installed and/or dimensioned in such a way that it permits radiation (e.g., actinic light or infrared light) to pass from one major side or surface and all the way to the other major side or surface of the card 1. The information which is encoded in or on the card 1 resides in the geometric distribution of the light conductors 11 and/or in the inclination (orientation) of the conductors with reference to each other and/or to the plane of the card. In the embodiment of FIGS. 1a, 1b and 2, the light conductors 11 are holes each having a diameter d which is a relatively small fraction of the thickness D of the card 1. The cross-sectional area $F_L$ of each hole 11 is relatively small, much smaller than $D^2$. In order to protect the holes 11 from contamination (e.g., from clogging which would prevent radiation from passing therethrough), the card 1 is preferably a laminated structure having a relatively thick central layer or panel 15 of opaque synthetic plastic material and two outer layers or panels 14 of relatively thin radiation-transmitting synthetic plastic material. As shown in FIG. 2, the thickness of each layer 14 can be a minute or relatively small fraction of the thickness of the median layer or panel 15. If the radiation is actinic light, the outer layers 14 are made of light-transmitting (transparent or translucent) plastic material. The outer layers 14 are welded or otherwise bonded to the median layer 15 in the regions (at 17) outside of those parts of the card 1 which are provided with the holes 11.

FIG. 2 shows that radiation 21 which impinges upon one side of the card 1 is allowed to penetrate into and through the holes 11 to issue at the other side of the card in the form of rays 22 which form a pattern 35 (see FIG. 3) having a configuration which is determined by the distribution and/or inclination of the holes 11. Thus, the pattern 35 constitutes the decoded information which is furnished by inserting the card 1 into an apparatus or machine having a source 2 of radiation 21 and an evaluating circuit for the radiation 22 (pattern 35). The light source 2 preferably comprises a suitable diffusor for radiation 21 (e.g., a pane made of glass or the like). This light source forms part of the apparatus or machine into which the card 1 is inserted for the purpose of evaluation, e.g., at the gate of a parking garage to enable the driver to enter or leave the premises. The properly inserted card 1 is disposed between the light source 2 and a battery 3 of detectors, preferably photoelectronic detectors, which evaluate the radiation 22, i.e., the pattern 35, and generate appropriate impulses denoting whether or not the card is acceptable for the specific purpose, e.g, for opening of the gate at the entry or exit of a parking garage. The detectors of the battery 3 constitute a single array 31 of discrete photodiodes 32, and the apparatus further includes an electric circuit 33 which receives signals from the diodes 32 and has an output 34 for a series of impulses. The parts 32, 33 and 34 are installed opposite the light source 2 in the automat or another machine which is designed to decode the information on the card 1.

As mentioned above, the light conductors 11 form straight rows 13 which extend in parallelism with two of the four marginal portions of the card 1, e.g., transversely of the card (in parallelism with the two shorter sides). The rows 13 are parallel to each other and also to the axis 37 of the array 31 of photodiodes 32. Furthermore, the rows 13 of light conductors 11 on a properly inserted card 1 extend at right angles to the direction LR (see FIG. 1a) of movement of the card into the decoding apparatus. Consequently, when the owner or user inserts the card 1 into the slot between the light source 2 and the battery 3 of photodiodes 32, entire patterns 35 of images of light conductors 11 forming rows 13 are evaluated by the photodioes 32 on the axis 37. Thus, insertion of the card 1 into the apparatus of FIG. 1 involves examination and evaluation of successive patterns 35, i.e., evaluation of each and every one of the patterns obtained by placing successive rows 13 of light conductors 11 into register with the light source 2.

The array 31 may include a row of closely adjacent photodiodes 32, for example 1024 photodiodes with a spacing of 0.025 mm between the centers of neighboring photodiodes. Thus, the total length of the row of photodiodes is 0.025 times 1024 or approximately 25 mm. Other types of arrays of photodiodes may include rows consisting of 128, 256 or 512 photodiodes. Furthermore, certain presently available photodiodes can be assembled into rows with a spacing of 0.015 mm between the centers of neighboring photodiodes.

Figure 3:
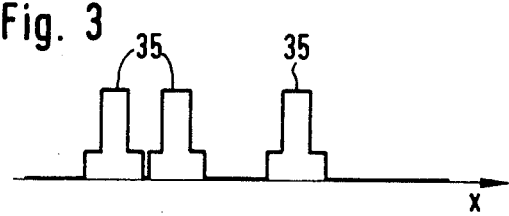
FIG. 3 is a schematic view of a pattern of light intensities and of impulses which can be generated in response to such light intensities by the decoding apparatus of FIGS. 1a and 1b.

When the card 1 is inserted into the slot between the parts 2 and 3 shown in FIG. 1, the radiation 22 forms a series of patterns 35 (one for each row 13 of light conductors 11), namely, a discrete pattern whenever a row 13 moves into register with the axis 37 of the array or row 31 of photodiodes 32. Such patterns are detected by the photodiodes 32 and the corresponding signals are transported by the shift registers (not specifically shown) of the circuit 33 so that the output 34 receives a series of electric impulses. The series of impulses is indicative of the geometric distribution of light conductors 11 and hence of the information which is encoded on the card 1. The impulses of such series denote whether or not the person using the card for a given purpose (e.g., for the purpose of identification for entry into a restricted area) is authorized to use the card. To this end, the impulses which are supplied by the output 34 are processed in a manner not forming part of the present invention. A portion of a series of impulses, produced as a result of evaluation of three photodiode signals, is shown in FIG. 3. The pattern 35 of FIG. 3 consists of three identical signals with a short distance between the first two impulses and a greater distance between the second and third signals (as considered in the direction of the arrow X).

If the distance S (see FIG. 2) between the centers of neighboring holes or light conductors 11 were increased so that it would equal or exceed the thickness D of the card 1, it would be possible to make two-dimensional copies of the card 1 by resorting to conventional copying means. Such copies could not be readily detected as bogus cards. In order to avoid such convenient copying by unauthorized persons, the light conductors 11 are preferably assembled into small groups 12 each of which consists of a relatively small number of discrete light conductors (e.g., of at least two and preferably three holes 11). The distance S between the centers of holes 11 in any given group 12 is preferably less than the thickness D of the card 1 and most preferably less than one-third of D. The distance between the outermost holes 11 of two neighboring groups 12 can be selected practically at will; it depends primarily on the amount and nature of stored information, on the dimensions of the card, and on the dimensions of the holes. The information which is represented by a group 12 of light conductors (holes) 11 denotes a bit or unit of information, for example, a unit of currency if the card 1 stores information which denotes a given amount of cash.

The distance W between a properly inserted card 1 and the array 31 of photodiodes 32 at least equals but preferably exceeds the thickness D of the card. This renders it possible to evaluate the card in the above outlined manner. The preferred distance W is 1-2D..

Figure 4:
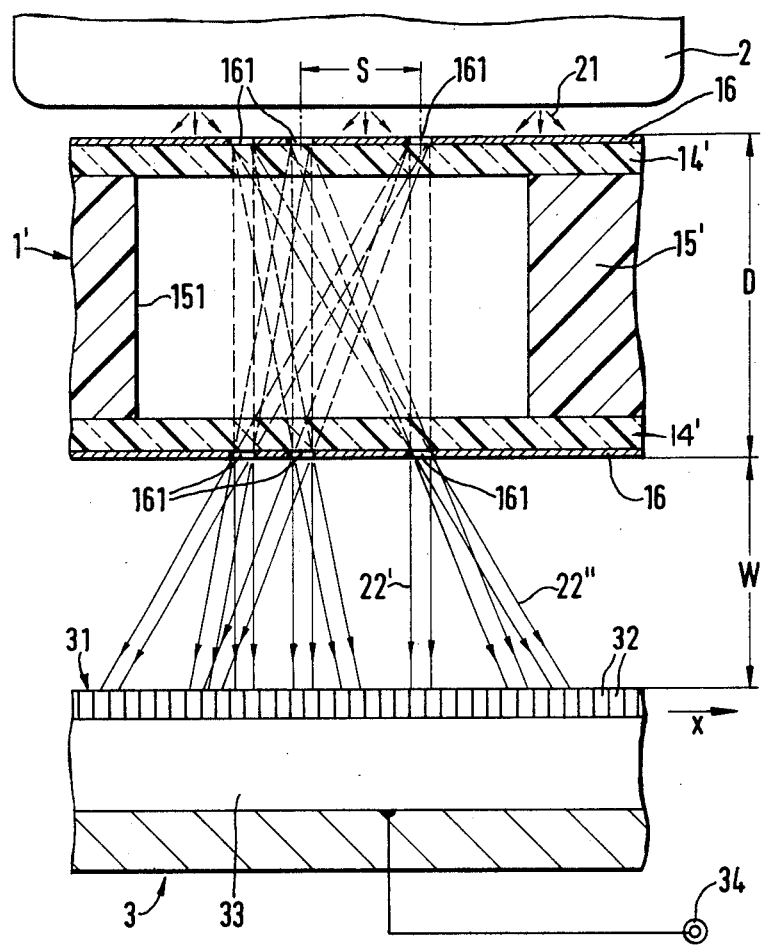
FIG. 4 is a greatly enlarged fragmentary sectional view of a counterfeit data carrier and of the decoding apparatus of FIG. 1b.
Figure 5:
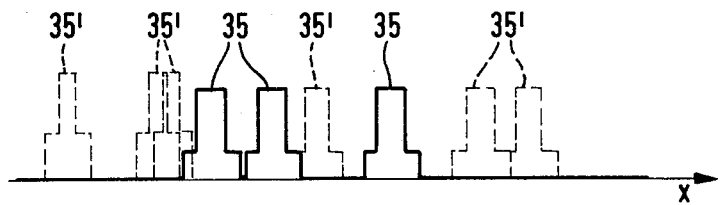
FIG. 5 is a schematic view of a pattern of impulses which are generated by the decoding apparatus in response to insertion of the counterfeit carrier of FIG. 4.

The influence of the distance S upon the facility of making unauthorized reproductions of the card which embodies the invention will be readily appreciated by referring to FIGS. 4 and 5. It is assumed that a genuine card 1 has been copied in a conventional copying machine to obtain two normal photocopies 16 with transparent spots 161. Each photocopy 16 is pasted to the respective side of a median layer 15' or to the exposed side of the respective outer layer 14' of the bogus card 1'. The median layer 15' has a relatively large opening 151 which can be formed therein at a low cost. This median layer merely serves as a mechanical support or distancing element for the photocopies 16.

The radiation 21 which is emitted by the source 2 can pass through the large opening 151 at right angles to the lanes of the photocopies 16 as well as at an oblique angle to such planes. The first type of (perpendicular) radiation is indicated at 22', and the second type of (inclined) radiation is indicated at 22". The radiation 22' is the "correct" and the radiation 22" is the "incorrect" radiation. Therefore, the pattern (see FIG. 5) which is formed by the radiation 22' and 22" is a composite pattern including a "proper" pattern 35 (formed by the radiation 22') and an "improper" pattern 35' formed by the radiation 22". The circuit 33 transmits a series of impulses which are taken off at the output 34 and can be readily recognized as those generated as a result of insertion of a counterfeit card.

An important advantage of the improved card is that the apparatus which is used to evaluate the information encoded in or on the card and/or the apparatus which is used to cancel certain portions of the card is relatively simple and inexpensive. One of the important reasons for such simplicity is that the apparatus utilizes a minimal number of components and that the components which are used are relatively simple, compact and inexpensive. Thus, and referring again to the apparatus of FIGS. 1a, 1b and 2, this apparatus merely employs a light source 2 and a circuitry whose most important component is the array 31 of photodiodes 32. There is no need to provide any further or additional optical means. All that counts is to ensure that the intensity of radiation 21 issuing from the source 2 suffices to penetrate through the adjacent (moving) light conductors 11 and influence the registering photodiodes 32 while the card is being inserted into the slot between the parts 2 and 3, i.e., while the groups 12 of light conductors 11 are in motion. The apparatus can be readily designed with a view to operate properly within a wide range of speeds of movement of the card 1 into the slot between the parts 2 and 3.

It is also within the purview of the invention to replace the source 2 of actinic light with a source of infrared light or other radiation which can be detected by the photodiodes. In other words, the material of the layers 14 and 15 can be selected in such a way that it is impermeable to light in the visible range of the spectrum.

Still further, the material of the median layer 15 can be selected in such a way that it absorbs a substantial selected percentage of radiation passing through the light conductors 11 or that it reflects a certain (selected) amount of such radiation.

The exact mode of making light conductors in the form of holes in the median layer 15 of the card 1 forms no part of the invention. For example, the layer 15 can be formed by pouring plasticized synthetic plastic material into a matrix or form which contains thin wires each causing the formation of a discrete hole 11. By the same token, one can resort to one or more lasers or to mechanical drilling means utilizing tools with diameters in the range of 0.05 mm. If the machine which makes the cards uses drills, the RPM of such drills is preferably high (e.g., in the range of $10^5$ revolutions per minute). Such machines are rather expensive. As a rule of thumb, the dimensions (diameters) of light conductors in the form of holes are directly related (inversely proportional) to convenience or facility of falsifying the cards. Thus, as the diameters of the light conductors decrease, the difficulty of unauthorized reproduction of the cards increases. Also, the cost of the cards is inversely proportional to the diameters of the light conductors, especially if the light conductors are holes which must be drilled into the layer 15 by mechanical means.

Figure 6:
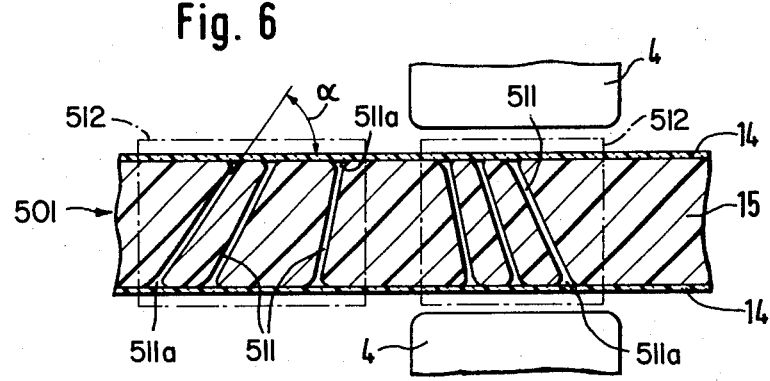
FIG. 6 is a fragmentary sectional view of a second data carrier which embodies the invention, and further showing a cancelling or deforming unit for selected bits or groups of information on the carrier, the cancelling unit being shown in the idle or inoperative position.

FIG. 6 illustrates that the light conductors (e.g., elongated small-diameter holes) need not extend at right angles to the exposed sides or surfaces of a card. The card 501 of FIG. 6 has a relatively thick median layer 15 which is sandwiched between two transparent and relatively thin outer layers 14. The light conductors 511 in the median layer 15 are elongated holes which are straight but are inclined with reference to the exposed surfaces of the card 501, i.e., the angles alpha between such elongated holes and the planes of the layers 14 are acute (oblique) angles in contrast to the right angles between the holes 11 and the planes of the outer layers 14 shown in FIGS. 1a, 1b and 2. In this embodiment of the improved card, the information which is encoded therein involves the number and distribution of the holes 511 as well as the angles alpha, i.e., the angles at which incident radiation is caused to pass through the holes 511 of the opaque median layer 15.

It is further within the purview of the invention to utilize other types of light conductors. For example, the light conductors in the form of holes 11 or 511 can be replaced with tubes or with filaments made of glass or light-conducting synthetic plastic material whose refraction index is different from the refraction index of the surrounding material (of the median layer 15).

Figure 8:
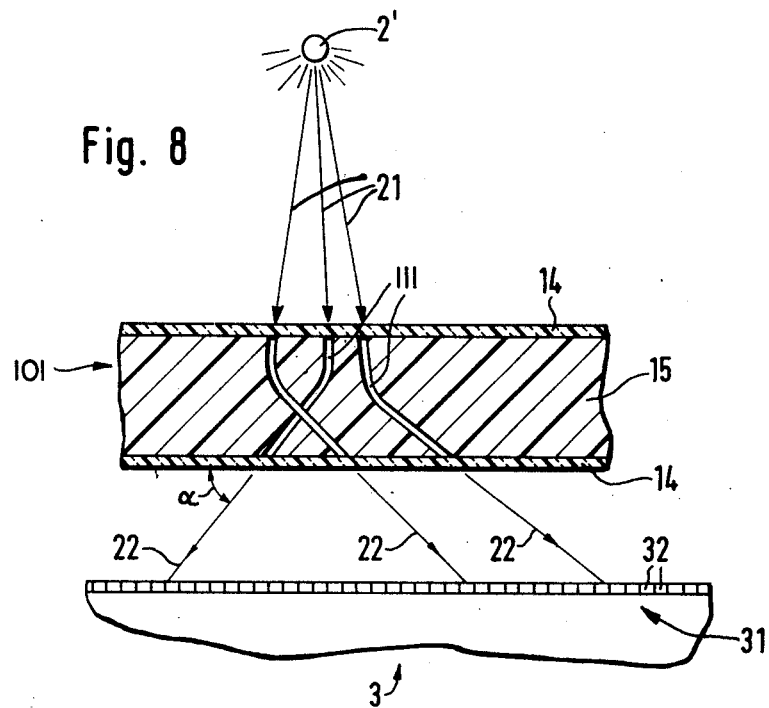
FIG. 8 is a fragmentary perspective view of a third data carrier which embodies the invention, and further showing a portion of an apparatus for decoding of the information which is borne by such carrier.

Still further, and as shown in FIG. 8, the light conductors 111 of the card 101 need not be straight but may resemble elbows or other arcuate configurations, as long as they can conduct light from one of the outer layers 14 to the other outer layer 14 at the respective sides of the opaque median layer 15. The light conductors 111 of FIG. 8 are assumed to consist of glass or a suitable synthetic plastic material. The pattern which is formed by the rays 22 due to the light source 2' and issuing from the card 101 of FIG. 8 is sufficiently complex to reduce the likelihood of falsification by unauthorized persons. The nature of such pattern depends on the distribution of the upper portions of light conductors 111 (as viewed in FIG. 8) as well as on the inclination of the lower portions (see the angle alpha) of such conductors with reference to the plane of the lower outer layer 14. It is even possible to utilize combinations of different light conductors in one and the same card, i.e., to use straight or curved or otherwise configured light conducting holes in combination with light-conducting filaments made of plastic or glass and/or light-conducting tubes made of a plastic or vitreous material.

Figure 7:
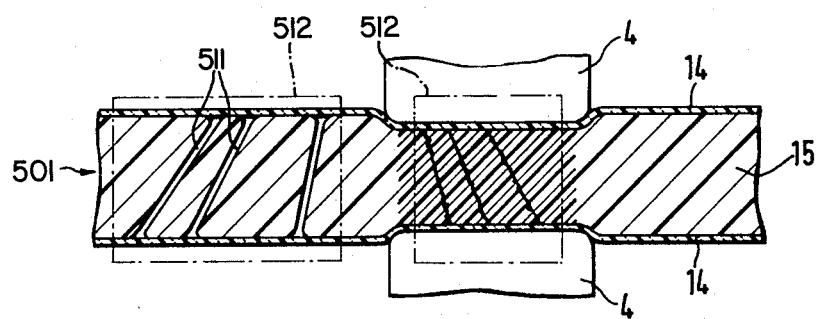
FIG. 7 illustrates the structure of FIG. 6 but with the cancelling unit in the operative position.

When the improved card is used as a substitute for cash, each and every group of two, three or more light conductors can represent a unit of currency. With reference to the aforementioned example, a card of the present invention can be furnished by banks or other money handling institutions in lieu of $100.—whereby each of one hundred discrete groups represents the equivalent of one dollar. Stepwise devaluation of the card can be effected in a number of different ways, for example, by destroying the light conductors of a given number of discrete groups. Such operation can be carried out in a manner as illustrated in FIG. 7 which shows the card 501 of FIG. 6. Each group 512 represents a unit of currency and the right-hand group 512 has been rendered invalid or "devaluated" by destroying the corresponding light conductors 511. Thus, if the card 501 of FIG. 7 bears a total of one hundred groups 512 and each group represents the equivalent of one dollar, the cancellation or erasure of one group 512 reduces the value of the card by one percent. The apparatus which is used to examine the card 501 and to cancel a selected number of groups 512 may comprise a discrete heating and deforming (cancelling) unit 4 for each group 512. When the card 501 is inserted into the slot of such apparatus, the unit 4 is activated to heat the corresponding (registering) portion of the card 501 so that the thickness of the respective card portion is reduced with the result that the light conductors 511 of the selected group 512 are deformed or disappear altogether. If the light conductors 511 are holes with diameters in the range of approximately 0.05 mm, minute quantities of air which are expelled in response to deformation of the material of the layer 15 around such holes can readily escape into the spaces between the outer sides of the layer 15 and the inner sides of the respective outer layers 14. It will be recalled that the outer layers 14 need not be bonded, in their entirety, to the respective sides of the median layer, i.e., it suffices if the marginal portions of the layers 14 are bonded to the corresponding marginal portions of the layer 15. This provides ample room for escape of minute quantities of air into the spaces between the layer 15 and the layers 14 in response to compression of one or more card portions and attendant deformation or elimination of corresponding groups 512 of holes. The end portions 511a (see FIG. 6) of the light conductors 511 can be enlarged to allow for ready escape of all traces of air from the light conductors 511 when the cancelling unit 4 is activated. FIG. 6 shows the two halves or jaws of the cancelling unit 4 in open or inoperative positions.

As a rule, the user or owner of a card prefers to be in a position to readily ascertain the number of cancelled groups 512. This enables the user or owner to calculate or estimate the number of uncancelled groups 512 and hence the remaining value of the card 501 as a substitute for cash. Such requirement can be readily satisfied in a number of different ways. For example, the material of the layers 14 and/or layer 15 of the card 501 shown in FIG. 7 can be selected in such a way that closing of the jaws of the cancelling unit 4 entails a discoloration (change of color) of the card portion bearing the freshly cancelled group or groups 512 of light conductors 511. Such change of color, opacity or other readily detectable characteristics of one or more selected portions of the card 501 in response to the application of heat and/or pressure is indicated in FIG. 7 by denser hatching in the region of the deformed or closed light conductors. It is equally possible to equip the cancelling unit 4 with a source of coloring matter which is applied to the heated portion or portions of the card 501 in order to allow for convenient identification of the cancelled portion or portions. Analogously, the cancelling unit 4 can cause chemical changes in the material of one or more layers of the card 501 and/or it can be provided with one or more sources of a suitable chemical agent which reacts with the adjacent portion or portions of the card 501 to facilitate convenient identification of each cancelled or devalued portion. In accordance with a further embodiment of the invention which is not specifically shown in the drawing, the cancelling unit 4 can be replaced with or may embody a punching or severing device which removes the adjacent portion or portions of the card 501 so that the user or owner can readily ascertain the remaining value of the card by observing the dimensions of the opening or the combined dimensions of two or more openings.

Figure 9:
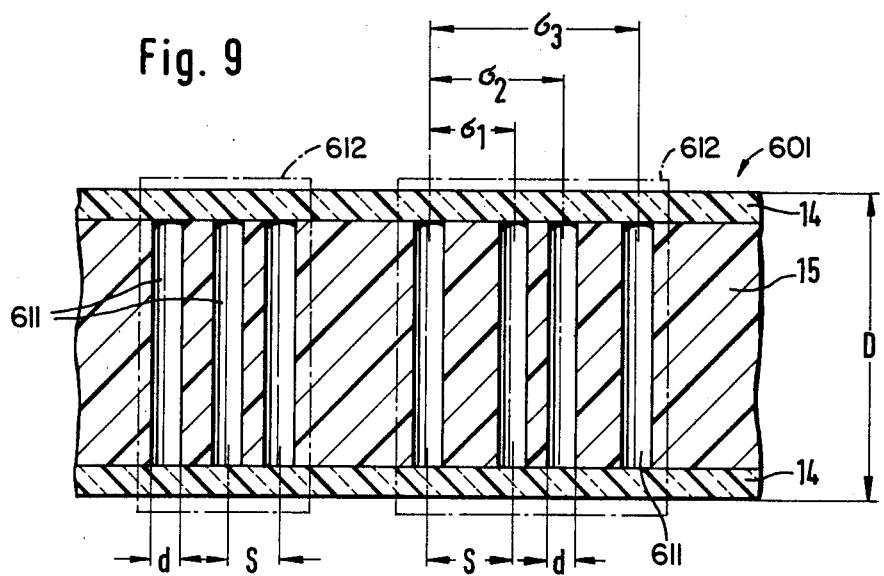
FIG. 9 is a fragmentary sectional view of a further data carrier.

FIG. 9 illustrates a portion of a card 601 with two groups 612 of light conductors 611. Each conductor 611 is a hole extending at right angles to the planes of the layers 14, 15, 14 which form the card 601. By properly selecting the spacing between and the distribution of holes 611 in the groups 612, it is very difficult, if not impossible, to make an acceptable unauthorized copy of the card. It is assumed that the thickness D of the card is 0.7 mm, that the diameter d of each hole 611 is 0.05 mm, and that the distance S between neighboring holes 611 in a group 612 is not in excess of and is preferably less than 0.3 mm. It would be practically impossible to drill such holes with requisite precision and at such small distances from each other. If each group 612 contains at least three discrete holes 611, a reproduction of the card 601 in a manner as described in connection with FIGS. 4 and 5 is evidently impossible. Moreover, if the apparatus which is to receive the improved card and to evaluate the information which is encoded in or on such card utilizes photodiodes in the aforementioned distribution (with a spacing of 0.015–0.025 mm between the centers of neighboring photodiodes), the patterns which are formed by the holes 611 of the groups 612 of the type shown in FIG. 9 can be detected and evaluated with a requisite degree of accuracy. The geometric constancy of arrays of photodiodes is very high and normally much higher than the geometric constancy of distribution of light conducting holes in a plastic card.

In order to eliminate the influence of temperature changes and/or changes of moisture content upon the dimensions of the card 601 and hence the influence of such changes on accuracy of scanning and evaluation of the card in an apparatus of the type shown in FIG. 2, the arrangement may be such that only the distribution of light conducting holes 611 within a group 612 serves for proper evaluation of the encoded information. Thus, and referring to the right-hand group 612 of FIG. 9, it is possible to design the card 601 and the evaluating apparatus in such a way that only the distances $sigma_1$, $sigma_2$ and $sigma_3$ are important as concerns the encoded information but the distance between the rightmost light conductor 611 of the left-hand group 612 and the leftmost light conductor 611 of the right-hand group 612 has no bearing on the nature of encoded information. The distance $sigma_1$ to $sigma_3$ can be in the range of 0.5 to 2 mm. Such distances can be readily maintained with requisite degree of accuracy and constancy.

Figure 10:
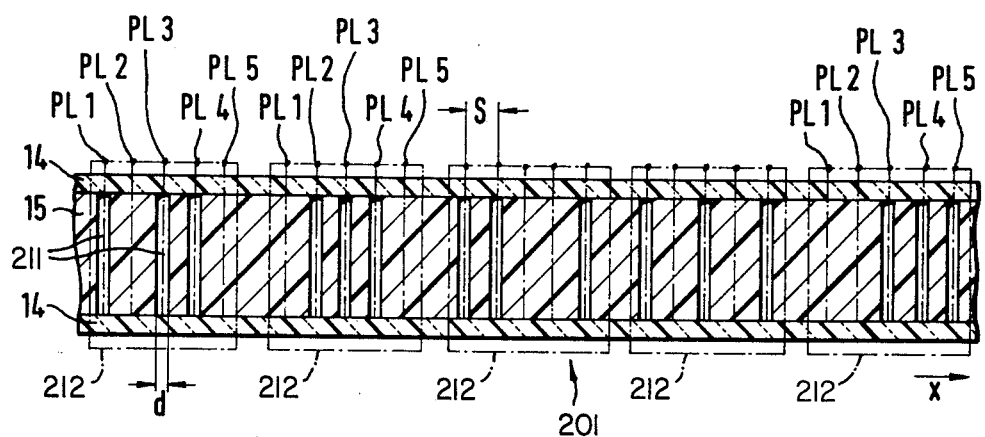
FIG. 10 is a fragmentary sectional view of an additional data carrier.

FIG. 10 shows a card 201 which is especially suited for storage of encoded information denoting decimal numbers. Each group 212 of light conductors 211 embraces three light conductors which occupy three out of five possible spots or locations in the space allocated for a group 212. These five spots or locations are indicated at $PL_1$, $PL_2$, $PL_3$, $PL_4$ and $PL_5$. The distance between the centers of two neighboring locations in any given group 212 equals S. It can be readily ascertained that the provision of five spots for three lights conductors furnishes at least $$\binom{5}{3} = 10$$

different distributions of light conductors in any of the groups 212. Each of the ten different combinations can represent a different one of ten decimal numbers 0 to 9 in encoded form. Five groups 212, each having three light conductors 211 in a different distribution, are shown in FIG. 10. Each decimal number is encoded in an error detecting redundant form.

By changing the number of light conductors 211 in certain groups 212 and by retaining five possible locations for light conductors in each of the groups, the card of FIG. 10 could provide a maximum of $2^5 = 32$ combinations of differently distributed light conductors. Of these 32 possible combinations, only ten are used as correct combinations, i.e., each of the ten correct combinations denotes a different decimal number. A group which contains only one light conductor, only two light conductors or more than three light conductors is a "phony" or incorrect group and can be readily detected. The same applies for groups 212 which contain correct numbers of light conductors but wherein one or more conductors are obscured (either entirely or in part) as a result of contamination, tampering or for other reasons. As already explained in connection with FIGS. 6 to 8, the light conductors 211 need not be straight and/or need not extend at right angles to the planes of the layers 14, 15, 14 of which the card consists. The angle (alpha in FIGS. 6 and 8) between the light conductors 211 and the planes of the layers 14, 15, 14 can be a relatively large or a relatively small oblique angle.

The light conductors 211 which are shown in FIG. 10 preferably form a straight row. The light conductors 211 can then be monitored by a row of photodiodes in the same way as shown in FIG. 2.

The distance S may equal or approximate 0.3 mm, i.e., the distance between the locations $PL_1$ and $PL_5$ in a given group 212 may be close to or may equal 1.2 mm. The distance between the centers of neighboring groups 212 can be in the range of 2 mm. If the length L (see FIG. 1b) of an array 31 of photodiodes 32 is approximately 25 mm and the distance between the centers of neighboring photodiodes is approximately 25 micrometers (i.e., if the number of photodiodes is in the range of one thousand), it is readily possible to simultaneously scan twelve groups 212, i.e., twelve decimal numbers at the same time. The positions of the light conductors can be ascertained with an accuracy in the range of ±0.025 mm.

The distance AL between neighboring rows (such as the rows 13 in FIG. 1a) of light conductors may be in the range of 1.5 mm so that it is readily possible to accommodate up to 50 rows 13 on a single card. This means that, if each row contains twelve decimal numbers, the card can store information amounting to 50 times 12 decimal numbers or a 600-digit number stored in 600 groups of light conductors. Each of such large number of decimal numbers can be selectively erased, cancelled or destroyed.

As regards the information which is stored in a given group of light conductors, such information depends on the relative distances of light conductors within a group and not on the absolute positions of light conductors. Therefore, it is possible to provide for a very high degree of accuracy with which the card must be scanned in order to decode the information. Furthermore, if the light conductors make oblique angles with the planes of the layers of a card, accurate geometric arrangement of the light conductors in a group is not the sole factor which determines the facility or accuracy of decoding of the information, i.e., the angles alpha are just as important. Therefore, the provision of light conductors of the type shown in FIGS. 6 to 8 renders it even more difficult to make counterfeit cards.

As mentioned above, the three important advantages of the improved card include the absence of likelihood of convenient counterfeiting (i.e., the difficulty and great cost of making of such cards by unauthorized persons without risking immediate detection). The difficulty of unauthorized reproduction is especially pronounced if the information is stored in three-dimensional form and if the distribution and/or orientation of light conductors is selected with the aforediscussed high degree of accuracy. The second important advantage of the improved card is that selected bits of encoded information can be erased or cancelled in a very simple, time-saving and inexpensive way. Moreover, the eradication of information is irreversible, i.e., one or more selected groups of light conductors can be destroyed or eliminated without the possibility of restoration by unauthorized persons. The third important advantage of the improved card is that it can store substantial amounts of information. This last named feature renders it possible to use the improved card in a number of different ways and for a number of different purposes including the following:

(A) As a pure substitute for currency (cash). Thus, each and every group of light conductors can represent a certain sum of money and the selected group or groups can be cancelled or removed by the application of heat and/or pressure and/or by cutting.

(B) For the purposes of identification. For example, a first set of groups of light conductors can denote a given number which differs from card to card (i.e., it can constitute the serial number of the card). A second set of groups of light conductors can denote a different type of information or identification which also varies from card to card. Such information can be furnished by an encoding calculator during making of the cards by taking into consideration the serial number of the card as well as a secret code. When the card is examined, the apparatus contains a similar encoding calculator and the secret code so that the apparatus can readily ascertain the genuineness or lack of genuineness of the correspondence between the serial number and the remaining information on a given card.

(C) As a combination of a cash substitute card and an identification card. For example, such a card can be issued by money lending or handling institutions as a means for paying instead of cash whereby the payment with the card is charged to the account of the owner or possessor of the card.

(D) As a means for storing information pertaining to the time of the day and/or additional time-denoting information. The card can be inserted into a clock or a like apparatus which destroys one or more groups of light conductors denoting a given time of the day, a given day of the week or month or a combination of such data. The light conductors can be readily grouped in such a way that they denote a large number of different times of the day, days of the week, weeks of the year and/or a combination of such data.

Figure 11:
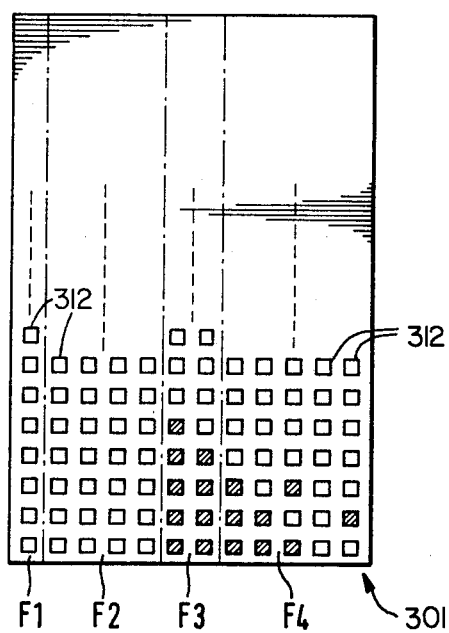
FIG. 11 is a schematic plan view of still another data carrier.

(E) As a combination of money substitute card, identification card and time recording card. Such a combination card can be provided with several sets of groups of light conductors, one set for each category of encoded information. As shown in FIG. 11, a first field $F_1$ of the card 301 can accommodate groups 312 of light conductors which denote the serial number of the card 301, a second field $F_2$ can accommodate groups 312 of light conductors denoting data which identify the owner or user of the card in addition to identification via serial number, a third field $F_3$ can contain encoded information denoting a certain sum of money, and a fourth field $F_4$ can contain information pertaining to times of the day, days of the week, etc. The erased or cancelled groups 312 in the card 301 of FIG. 11 are denoted by hatching. Each of the non-erased groups 312 shown in FIG. 11 denotes a discrete decimal number in encoded form.

Figure 12:
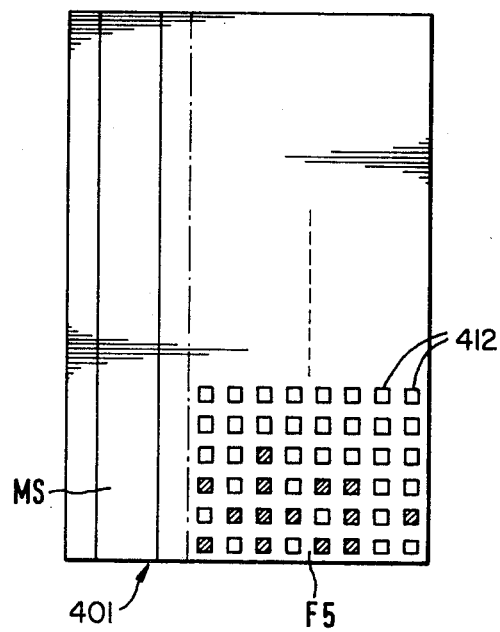
FIG. 12 is a schematic plan view of a data carrier which embodies light conductors as well as one or more information storing magnetic tracks.

The aforediscussed advantageous features of the improved card (namely, difficulty of falsification, ready cancellation bits of information and great capacity, i.e., ability to store large amounts of adequately encoded information which can be readily decoded by a reader) render it possible to construct the card in such a way that a first part or section thereof bears encoded information in the form of properly distributed and oriented light conductors and a second part or section of the card bears an entirely different type of information, e.g., in the form of data encoded on a magnetic track MS shown in FIG. 12. The part or section $F_5$ bears information in the form of groups 412 of light conductors. The card is denoted by the reference character 401. The track MS serves as a means for repeatedly storing selected information, for example, data denoting different amounts of currency and/or data denoting various units of time or various times of the day, week, month, etc. In each instance, the card should be designed with a view to reduce the probability of falsification or counterfeiting, a feature which cannot be readily achieved if all of the information is to be stored on one or more magnetic tracks. The provision of the part or section $F_5$ in addition to the track or tracks MS of FIG. 12 renders it much less likely that the card 401 would be produced by unauthorized persons.

Let it be assumed that the card 401 of FIG. 1 serves as a substitute for cash currency. The genuineness or lack of genuineness of such card can be readily ascertained by proceeding in a manner as outlined above, namely, by decoding the information on the part or section $F_5$, i.e., by decoding the information which is stored in the form of the light conductors constituting the groups 412. The information which is encoded in the form of the light conductors forming the groups 412 may include data denoting the serial number of the card 401 as well as other indicia or data identifying the bearer or user of the card in addition to identification by the serial number. The sum of money is magnetically recorded on the track or tracks MS at a suitable station in properly encoded form, e.g., by resorting to a coding and/or decoding device of any known design. For the purpose of encoding, information representing the sum of money in a secret code as well as the information currently denoted by the light conductors of the groups 412 is supplied to the encoding computer. In the course of each devaluing or cancelling operation, the cancelling machine irreversibly erases or cancels one or more groups 412 of light conductors in the part or section $F_5$. This automatically entails an irreversible alteration of the mode of encoding. Without such alteration of the encoding mode, the information which is stored on the tape MS could be transferred onto a magnetic recording band prior to cancellation of the amount represented by such information. The card would thereupon be used to pay a debt with attendant cancellation of the amount which is denoted by the information on the tape MS, and the information denoting the full amount of cash would subsequently be transferred back from the tape onto the track MS so that the card 401 could be fraudulently reused. The lack of knowledge of the secret code would be of no consequence. In other words, a forger could reinstate the original full amount on the track MS as often as desired. However, since the information which is denoted by the light conductors of the groups 412 in the part or section $F_5$ is in the computer as an auxiliary to the magnetically recorded amount of money as well as for subsequent decoding of information which is stored on the track MS, and since the information which is denoted by the groups 412 changes in response to each cancellation of a portion of the information borne by the track MS, forging of the card 401 is practically impossible. Thus, when the information on the track MS is decoded for the first time, such decoding is preceded by or takes place simultaneously with decoding of all the information on the part $F_5$ of the card 401. Susequent decoding of magnetically recorded information necessitates the availability of information which is stored in the remaining (uncancelled) groups 412, and so fourth. In other words, the information which is needed to alter the amount of money denoted by the magnetically recorded information varies from cancellation to cancellation by reducing the number of effective or active groups 412.

It will be noted that, by the simple expedient of using the part or section $F_5$ in addition to the magnetic track or tracks MS, the information which is encoded on the track cannot be readily decoded without resorting to equipment whose operation is dependent on the knowledge of the secret code which is necessary to interpret and alter the magnetically recorded information.

The cancelled or erased groups 412 in the part or section $F_5$ of the card 401 shown in FIG. 12 are denoted by hatching for convenience of interpretation. Each of the non-erased or uncancelled groups 412 denotes or can denote a decimal number.

If desired, the data carrier of the present invention may resemble a key for convenient insertion into a decoding, cancelling or like apparatus. The data bearing portion may constitute the key bit.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:
1. A data carrier comprising:
(a) a body of predetermined thickness having a layer which is opaque to radiation of a predetermined wavelength; and
(b) a plurality of conductors of said radiation extending through said layer, said conductors having a geometric distribution representing encoded information decipherable by a reader and being arranged in discrete groups, and the distance between neighboring conductors of a group being less than about twice said predetermined thickness, each of said conductors having a cross-sectional area at most equaling the square of said predetermined thickness.

2. The carrier of claim 1, wherein said conductors are arranged in a predetermined orientation relative to each other and the plane of said layer, such orientation constituting additional information.

3. The carrier of claim 1, wherein at least some of said conductors are holes.

4. The carrier of claim 3, wherein said holes have diameters less than about one-half of said predetermined thickness.

5. The carrier of claim 3, wherein said holes are bores which are obtained as a result of removal of the material of said layer.

6. The carrier of claim 1, further comprising two outer layers transparent to said radiation, said opaque layer being disposed between said outer layers.

7. The carrier of claim 1, wherein said body is substantially flat.

8. The carrier of claim 1, wherein each of said groups contains more than two conductors.

9. The carrier of claim 1, wherein said distance at most equals said predetermined thickness.

10. The carrier of claim 1, wherein said conductors of said groups form at least one elongated row.

11. The carrier of claim 1, wherein said conductors form several parallel rows.

12. The carrier of claim 11 for insertion into a reader in a predetermined direction, wherein said rows are substantially normal to said predetermined direction.

13. The carrier of claim 1, wherein each of said groups contains three conductors which occupy three of five possible locations, said locations permitting ten different distributions of conductors and each of said distributions denoting a different decimal number.

14. The carrier of claim 1, wherein said layer consists of a material allowing for thermally, chemically and/or mechanically induced destruction of selected conductors.

15. The carrier of claim 14, wherein the conductors of each of said groups are destructible simultaneously.

16. The carrier of claim 14, wherein the destruction of a conductor causes a change in the color of said layer.

17. The carrier of claim 1, for decoding in a reader having photoelectronic transducers forming a row of predetermined length, wherein said conductors form at least one row and the distances between neighboring conductors of said one row are less than said predetermined length.

18. The carrier of claim 1, wherein said layer forms part of a card.

19. The carrier of claim 1, wherein said layer forms part of a key.

20. The carrier of claim 1, wherein said groups define a first field representing an encoded serial number, and at least one additional field representing encoded information other than said serial number.

21. The carrier of claim 20, wherein each of said fields includes a plurality of said groups and each group denotes a discrete bit of information.

22. The carrier of claim 20, wherein encoded information of said additional field is related to said serial number.

23. The carrier of claim 1, wherein said groups define at least one field representing a serial number in encoded form.

24. The carrier of claim 1, wherein said groups define at least one field representing a predetermined sum of money in encoded form.

25. The carrier of claim 24, wherein each group of said field denotes a unit of said sum of money.

26. The carrier of claim 25, wherein each group of said field is independently deformable to cancel the respective unit.

27. The carrier of claim 1, wherein said groups define at least one field representing various times in encoded form.

28. The carrier of claim 1, wherein said conductors are light conductors.

29. The carrier of claim 1, wherein said groups define at least one field and a second field is provided for storage of encoded information other than in the form of light conductors.

30. The carrier of claim 29, wherein said second field includes at least one magnetic track.

31. The carrier of claim 30, wherein the information which is stored on said track is related to and variable with changes in the information encoded in said one field.

32. The carrier of claim 1, wherein said conductors extend through said layer generally in the direction of the thickness dimension thereof.

33. The carrier of claim 1, wherein neighboring ones of said groups are separated by a gap having a length which is large compared to said distance.

* * * * *